May 2, 1933.  J. H. DE BOER ET AL  1,906,448
PHOTO ELECTRIC TUBE
Filed Jan. 11, 1930
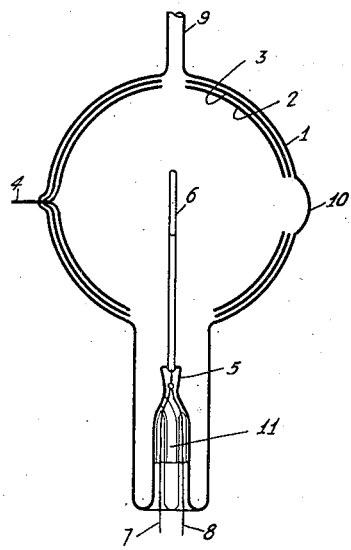
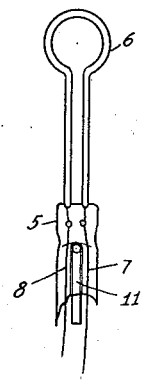
INVENTORS
JAN HENDRIK DeBOER AND
BY MARTEN CORNELIS TEVES
ATTORNEY Patented May 2, 1933

1,906,448

UNITED STATES PATENT OFFICE

JAN HENDRIK DE BOER AND MARTEN CORNELIS TEVES, OF EINDHOVEN, NETHERLANDS, ASSIGNORS TO RADIO CORPORATION OF AMERICA, A CORPORATION OF DELAWARE

PHOTO-ELECTRIC TUBE

Application filed January 11, 1930, Serial No. 420,085, and in the Netherlands January 12, 1929.

This invention relates to photo-electric tubes and covers an improvement in or a modification of the invention described and claimed in our copending application, Serial No. 392,306, filed September 13, 1929.

In this specification is described a photo-electric tube which has sandwiched between the photo-electric layer and a substratum a substance containing a chemical compound which may consist of a compound of a metal that does not occur in the substratum. Preferably, the chemical compound is such that it absorbs the photo-active substance better than does the material by which the substratum is constituted. Oxides, such as magnesium oxide, and halides, such as calcium fluoride are especially available. The chemical compound in such a photo-tube may be applied mechanically, for example, by smearing the substratum with the compound or by distintegration of the latter. In some cases the chemical compound may be formed by etching the substratum.

It has been found that the sensibility of such a photo-electric tube can be intensified and the uniformity of its action can be improved by making the tube contain such a slight quantity of photo-active substance that the pressure of the vapour of this substance is lower than the normal vapour pressure of the substance.

This may be ensured by heating the photo-electric tube, after the insertion of the photo-active substance and while the tube is connected to a vacuum pump, to a suitable temperature so that the active substance which is not adsorbed by the chemical compound volatilizes and can be removed from the tube. Thus, it is possible to coat the photo-electric electrode with a monatomic layer of the photo-active material.

It is established that the sensibility of such a photo-electric tube is high and its working is uniform. At the same time a good insulation between the members in the tube that during the operation are under tension is obtained.

The invention will be more clearly understood by reference to the accompanying drawing in which a photo-electric tube embodying the invention is illustrated, and wherein, Fig. 1 shows diagrammatically, a photo-electric tube according to the invention; and, Fig. 2 is a detail view thereof.

The wall 1 of the photo-electric tube shown consists of glass and the tube is internally provided with a layer 2 constituted by a photo-active substance. This layer may be formed by an alkali metal, for example caesium, but also other light sensitive substances such as alkaline earth metals are adapted to be used in the tube according to the invention. The photo-active layer 2 is not mounted directly on the wall of the tube but on an intermediate layer 3 consisting of a chemical compound, in this case calcium fluoride. The photo-active electrode thus formed is in electrical connection with a leading-in wire 4. The pinch 5 has mounted on it an electrode 6 which, as is clearly shown in Fig. 2, has the shape of a substantially closed ring and is connected to two current leads 7 and 8. Before its insertion in the tube this ring-shaped electrode may be sprayed with calcium fluoride which after exhaustion of the tube is volatilized, for which purpose an electric current may be passed through the electrode 6 by means of the current leads 7 and 8. The calcium fluoride volatilized is deposited on the wall of the tube, where it constitutes the layer 3. If necessary the parts of the wall on which a precipitate of the calcium fluoride is inconvenient may be kept at a higher temperature during the volatilization of the substance so that the calcium fluoride is not deposited on the said parts.

The intermediate layer may be applied in another manner, for example, by smearing the wall of the tube directly or spraying it with the chemical compound of which the intermediate layer is made.

The photo-active substance constituted by caesium may be inserted in the tube by volatilization from a side tube which may be connected to the tube, for example, at 9, or in any other suitable manner.

After the insertion of the caesium, the tube whilst being connected through the tube 11 to a vacuum pump is heated to a suitable temperature, say about 300° C. By thus heating, the cæsium which is not adsorbed by the intermediate layer, will volatilize and will be removed from the tube by the vacuum pump. Thus it is possible to form on the layer 3, a layer of few atoms or even a monatomic layer of the photoactive material whereas any photo-active substance deposited outside the intermediate layer volatilizes and is removed.

The tube may be filled with a gas, for example a rare gas, or may be maintained exhausted of air.

When operating the tube shown the electrode 6 is given a positive potential relatively to the photo-active electrode and the latter is subjected to radiation by light which can enter in the tube through the window 10 not coated with the photo-active substance and which dislodges electrons from the photo-electrically sensitive layer, the number of electrons dislodged depending on the intensity of the exposure.

While the invention has been described only in connection with one of the preferred forms thereof, we believe ourselves to be entitled to make and use any and all modifications such as fall fairly within the spirit and scope, and such as would at once suggest themselves to those skilled in the art to which the invention relates.

Having now described our invention, what we claim and desire to secure by Letters Patent is the following:

1. The method of preparing a light sensitive electrode which includes depositing a sub-stratum layer of a halide of an alkaline earth metal on the inner wall of an evacuated glass container, depositing by adsorption photo-electric material upon said sub-stratum layer while maintaining said vacuum and heating the container while maintaining the said vacuum for removing unadsorbed particles.

2. The method of preparing a light sensitive electrode which includes depositing by vaporization in vacuo a sub-stratum layer of a fluoride of an alkaline earth metal on the inner wall of an evacuated glass container, depositing a light sensitive electron emitting material upon the sub-stratum layer while maintaining the said vacuum, heating the container to a point above the volatilizing point of said light sensitive material while maintaining said vacuum for volatilizing said material not adsorbed by said sub-stratum, and removing said volatilization product by said vacuum.

3. A photo-electric tube comprising an evacuated envelope, an anode, and a cathode comprising a layer of calcium fluoride having a surface film of photo-active substance adsorbed on said layer, the vapor pressure of said substance of the film being less than the normal vapor pressure of said substance.

4. A photo-electric tube comprising an evacuated envelope, an anode, and a cathode comprising a layer of calcium fluoride having a surface film of cæsium adsorbed on said layer, the vapor pressure in said envelope of the film in said envelope being less than the normal vapor pressure of cæsium.

5. A photo-electric cathode consisting of a substratum of a halide of an alkaline earth metal having an adsorbed monomolecular layer of photo-electric material.

JAN HENDRIK DE BOER.
MARTEN CORNELIS TEVES.